United States Patent [19]

Yasufuku et al.

[11] Patent Number: 4,684,572
[45] Date of Patent: Aug. 4, 1987

[54] MAGNETIC RECORDING MEDIUM

[75] Inventors: Yoshitaka Yasufuku, Hino; Masaji Nara; Shigeru Akutsu, both of Hachioji, all of Japan

[73] Assignee: Konishiroku Photo Industry Co., Ltd., Tokyo, Japan

[21] Appl. No.: 726,034

[22] Filed: Apr. 23, 1985

[30] Foreign Application Priority Data

Apr. 27, 1984 [JP] Japan ................................. 59-83899

[51] Int. Cl.$^4$ ............................................... G11B 5/68
[52] U.S. Cl. .................................... 428/323; 428/327; 428/336; 428/694; 428/695; 428/900
[58] Field of Search ............... 428/694, 695, 900, 323, 428/327, 336; 427/131

[56] References Cited

U.S. PATENT DOCUMENTS

| | | | |
|---|---|---|---|
| 4,367,261 | 1/1983 | Miyoshi et al. | 428/694 |
| 4,451,531 | 5/1984 | Isobe et al. | 428/694 |
| 4,474,843 | 10/1984 | Miyoshi et al. | 427/131 |
| 4,539,257 | 9/1985 | Ryoke et al. | 427/131 |
| 4,544,601 | 10/1985 | Yamaguchi et al. | 427/131 |
| 4,551,386 | 11/1985 | Yamaguchi et al. | 427/131 |
| 4,555,431 | 11/1985 | Miyatsuka | 427/131 |

*Primary Examiner*—Paul J. Thibodeau
*Attorney, Agent, or Firm*—Jordan B. Bierman

[57] ABSTRACT

A magnetic recording medium having a magnetic layer and a backing layer on opposite sides of a support is disclosed. The backing layer comprises a binder resin, a conductive carbon black and an organic powder.

6 Claims, No Drawings

MAGNETIC RECORDING MEDIUM

BACKGROUND OF THE INVENTION

1. Field of the Invention

The present invention relates to a magnetic recording medium, and more particularly to a recording medium comprising a support having on the obverse thereof a magnetic layer and on the reverse thereof a backcoat layer, the backcoat layer being improved on the physical characteristics thereof for the purpose of improving the running stability and the S/N ratio of the recording medium.

2. Description of the Prior Art

Magnetic recording media such as magnetic tape, magnetic sheets and magnetic disks are widely used in the audio, video and computer fields. Of these fields, for example, speaking of the magnetic tape used in the video field, when performing the recording of a picture or the playback of the recorded picture, the magnetic tape contained in a cassette, after the cassette is loaded in a video deck, is run, being guided through the guide pole or guide roller, to be rubbedly scanned by a magnetic head. In this instance, for the recording of a picture or for the playback of the recorded picture, the tape needs to be run constantly and uniformly wound so as to be always ready for its repetitive use, and, since the tape is run rapidly and usually made of a high-electric-resistance material, the tape's obverse to be brought into contact with the guide pole, etc., is required to have an antistatic effect as well as to be suitable for the tape's run. Further, for the improvement of the sensitivity of the tape, particularly for the improvement of the output from the tape in high frequency regions, the surface of the magnetic layer of the tape is finished to be smooth so that the rubbing condition of the magnetic tape with the magnetic head is not varied, and is improved on the running stability and durability of the magnetic layer against the magnetic head, guide roller, and the like.

However, when the magnetic tape is run through the video deck, since not only the obverse but the reverse of the magnetic tape is also rubbed with the above-mentioned guide pole or guide roller, even if the obverse magnetic layer alone has good running stability and durability against the guide pole or guide roller, if the running stability and durability of the reverse of the magnetic tape are not satisfactory, the running magnetic tape undergoes an excessive tension to cause the magnetic layer to be rubbed to excess with the magnetic head, bringing about not only damage of the magnetic layer and exfoliation of the magnetic powder from the magnetic layer but also not-uniform tape-winding tension to vary the wound pressure to put the wound form into disorder, whereby the face formed of the wound-up edge of the tape becomes awkwardly uneven, leading to lack of the tape running speed uniformity when the tape is reused. If these phenomena occur, a skew or jitter trouble appears or the video or electromagnetic characteristics such as S/N ratios become deteriorated. In order to improve these problems, providing a backcoat layer on the reverse side of the magnetic tape is proposed.

Particularly, in recent years the magnetic recording medium such as the video tape has been improved to have a high-recording density. For performing the playback of a video image recorded on the high-density magnetic recording medium, the question of how to improve the running stability and various N/S ratios of the magnetic recording medium is a vital of importance. Upon this, some attempts have been made for the improvement.

The attempts include those relating to roughening the reverse surface of the tape and to improvement of the antistatic effect of the same. For example, there is an attempt to incorporate an inorganic powdery material into the resin backcoat layer of the magnetic tape. This is intended to roughen the surface of the backcoat layer to reduce the contact area thereof with the guide pole, etc., to lessen the coefficient of friction. For example, Japanese Patent Publication Open to Public Inspection (hereinafter referred to as Japanese Patent 0.P.I. Publication) Nos. 130234/1982, 161135/1983, 53825/1982 and 2415/1983 all describe examples of the use of inorganic powdery materials. And many of these examples define the usable particle size range of such powdery materials. However, even the backcoat layer using such the inorganic powdery material, since not only is the powdery material unable to provide a sufficient slidability but its hardness is large, when brought into contact with the guide pin, etc., scratches or scrapes off the surface of the pin, so that there are cases where the backcoat layer impairs the function of means such as the pin intended to smoothly guide and run the tape, and, besides, when the backcoat layer containing the powdery material is rubbed by such means, the combining power of its particles with the binder is not enough against the rubbing, thus tending to cause exfoliation of the particles. And when particularly large-size particles are mingled among the powdery particles, the exfoliation tends to be accelerated. Further, when the backcoat layer and the magnetic layer of the tape are brought into contact with each other when the tape is wound up, the protrusions of the backcoat layer scratch the surface of the magnetic layer or the ruggedness pattern markings of the backcoat layer are left on the surface of the magnetic layer, and such the defects, when the tape is scanned to play back a recorded video image, sometimes adversely affect the electromagnetic characteristics such as the chroma S/N ratio showing the degree of the reproducibility of the colors of the video image.

Such inorganic powdery materials as described in the above-mentioned patent publications, when used in various atmospheric conditions, tend to absorb moisture contained in air, particularly during its storage or during its use in the video deck or the like. When the magnetic recording medium thus absorbs moisute, the surface thereof becomes prone to adhere to the metallic guide pole, and the adherence may sometimes cause temporary stops of the constantly running magnetic recording medium. When the strain caused by such temporary stops becomes accumulated to excess, the recording tape is suddenly pulled this time to be fed at a great stride, causing the so-called "stick strip" phenomenon, thus resulting in the unstable running of the tape.

Instead of the above-described inorganic powery material the use of carbon black which is not as hard as the powdery material is also proposed. This is described in, e.g., Japanese Patent Examined Publication No. 17401/1977. This is intended to provide an antistatic function based on the conductivity of carbon black and the surface roughening effect by the particles thereof. However, since the mean particle size range of the carbon black used is from 0.01 to 0.02 μm, the dispersibility thereof in a coating liquid thereof is very poor, and the resulting backcoat layer formed from the dispersed liquid has no uniform surface because of the aggregated particle lumps of the carbon black, which form an irregular roughness of the surface. In addition, because the combining power of the aggregated particles with the binder is not so large, they tend to be exfoliated and further larger ones of the exfoliated particle lumps leave their pattern markings on the surface of the magnetic layer to roughen the same when the tape is rewound to bring the backcoat and magnetic layers into contact with each other. After all, even when the carbon black having such a small particle size is used, it is difficult to obtain a mean surface roughness of, e.g., not more than 0.035 μm, which enables to avoid the formation of the above-mentioned roughness on the surface of the magnetic layer.

As described in Japanese Patent Examined Publication No. 37003/1978, a different recording medium is also known which is such that a subbing layer is provided underneath the backcoat layer, into the subbing layer are incorporated carbon black, graphite and metallic powder, and on the subbing layer is provided another layer containing a pigment, thereby allotting the antistatic effect and surface-roughening effect to both the layers, respectively. This instance, however, has the disadvantage that, in addition to the trouble to provide double layers, the influence by the roughness according to the particles contained in the lower layer appears on the upper layer, and thus the surface is excessively roughened just as the above carbon black-applied instance is.

If the hardness of the inorganic powdery material used in the backcoat layer is thus large or the mean surface roughness of the layer is unable to satisfy the above intended value, neither the running stability nor any sufficient wear resistance and durability of the magnetic recording medium can be obtained; for example, it deteriorates the played-back video image quality, causes the magnetic layer's exfoliation trouble, makes the output fluctuation uncontrollable, or adversely affects the electromagnetic conversion characteristics such as the above chroma S/N ratio.

Particularly, the latest video recorders including VHS-type video movie, β-movie and 8 mm video recorders are miniaturized to be portable with high-density recordability, so that the video recording can be made in various ways, ranging from the conventional ways of video shooting in a fixed position to the mobile outdoor shooting on the spot in various situations. Accordingly, the magnetic tape also has been desired to have characteristics durable against any atmospheric conditions. The miniaturization with high-density recordability complicates the magnetic tape run system with increasing the number of chances of the tape to touch the guide poles and guide rollers, whereby the tape is rubbed with the guide means very frequently, and therefore the improvement of the tape with respect to the wear resistance and durability to further increase the running stability and to prevent the exfoliation trouble has been demanded. In order to meet the demand, further improvement of the surface characteristics of the backcoat layer is essential.

OBJECTS OF THE INVENTION

It is therefore a first object of the present invention to provide a magnetic recording medium having a backcoat layer which will bring about no such a phenomenon impairing the running stability of the magnetic recording medium as the so-called "stick-strip" phenomenon.

It is a second object of the present invention to provide a magnetic recording medium which is excellent in various S/N ratios by being provided with a backcoat layer having excellent running stability, wear resistance and durability.

SUMMARY OF THE INVENTION

The above objects are accomplished by providing a magnetic recording medium which comprises a support having on one side thereof a magnetic layer and directly on the other side thereof a backcoat layer, the backcoat layer comprising a binder resin and carbon black, the carbon black being in a quantity of 25-100 parts by weight to 100 parts by weight of the binder resin, the backcoat layer having a mean surface roughness of from 0.005 μm to 0.035 μm and a surface resistivity of from $10^1$ to $10^6 \Omega$ cm.

DETAILED DESCRIPTION OF THE INVENTION

The carbon black to be used in this invention is desirable to be conductive. One whose particles cluster like a bunch of grapes is suitable as the carbon black. The carbon black is also desirable to be one being porous with a large specific surface, i.e., one being on a high-structure level. The preferred carbon blacks are ones having a primary mean particle size of from 0.020 to 0.029 μm, and among these one having an oil absorption (dibutyl phthalate is used as the oil) of from 90 ml/100 g to 500 ml/100 g is particularly suitable because it is prone to take the high-level structure enabling to expect a large conductivity. If the carbon black is of such a particle size, when a backcoat layer is formed of the carbon black along with a binder that will be described hereinafter, the mean surface roughness can be from 0.005 μm to 0.035 μm, and more preferably from 0.005 μm to 0.030 μm. The surface resistivity in this instance is desirable to be from $10^1$ to $10^6 \Omega$ cm. If the particle size of the carbon black is not more than 0.020 μm, it is undesirable because the dispersibility thereof in a coating liquid thereof is deteriorated, and as a result, the surface of the backcoat layer is excessively roughened as described above, while if the particle size is not less than 0.029 μm, it is disadvantageous in respect that the surface of the backcoat layer becomes conspicuously rugged to leave the ruggedness pattern markings on the surface of the magnetic layer when the tape is wound up.

From the above points of view, the Raven 1255, 1250, 1200, 1170, 1041, 1035, 10301, 1020, 1000 and 890H; and Conductex 975 and 900; and the like, manufactured by Columbia Carbon, are exemplified as the suitably usable carbon black.

The above carbon black is to be used in a quantity of 25-100 parts by weight to 100 parts by weight of a binder that will be described hereinafter. If the quantity is less than the above range, the surface-roughening effect and antistatic effect are small, while if the quantity exceeds the range, the mechanical nature of the resulting backcoat layer becomes weak.

The thickness of the backcoat layer is preferably from 0.1 μm to 1.5 μm, and more preferably 0.5 μm to 1.0 μm.

The carbon black used in this invention may be a sulfur-containing lubricative carbon black, which is typified by Carbon Black #4000B, manufactured by Mitsubishi Chemical Industries, Ltd. (sulfur content 0.03%, particle size 0.020 μm). This carbon black, since it contains sulfur, is well adaptable to, e.g., resins usable as the binder for the backcoat layer or overcoat layer, and although its particle size is small, is excellent in the dispersibility, so that it by no means roughen the surface of these layers to excess. And further it can provide surface lubricity. In order that carbon black can provide the thus excellent dispersibility and surface lubricity, the adding quantity of sulfur to the carbon black should be from 0.01 to 0.5% by weight, and preferably from 0.03 to 0.1% by weight.

The sulfur-containing carbon black may be used alone, and is also desirable to be used in combination with a —SH group-having silicone oil because the —SH group has a good affinity for the sulfur-containing carbon black, so that the silicone oil can be well adapted through the carbon black to the resin of the binder. Such the silicone oil having affinity for resins by no means oozes out to soil the magnetic head, which then soils the magnetic layer just as conventional silicone oils do.

The above —SH group-having silicone oil includes mercapto-modified compounds having the formula:

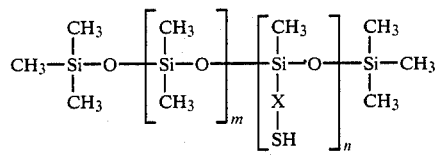

wherein X represents a hydrocarbon residue having from 1 to 30 carbon atoms; m is up to 1000; and n is from 1 to 300, provided m+n ≦ 1000.

Examples of the above include the following compounds:

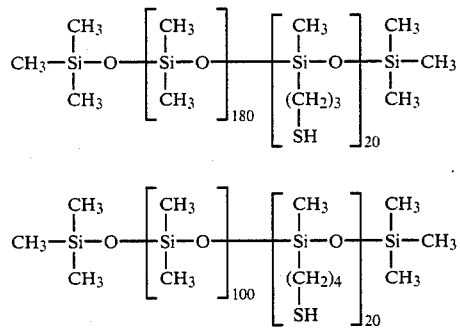

The above sulfur-containing carbon black may be used in combination with another carbon black which is conductive, e.g., which has a surface resistivity of not more than $10^6 \Omega$ cm. As such the carbon black those whose particles cluster like a bunch of grapes are suitable, and they are desirable to be porous with a large specific surface and to be on a high structure level. The primary mean particle size of the carbon black is preferably from 0.020 to 0.029 μm, and particularly one having an oil absorption (dibutyl phthalate is used as the oil) of not less than 90 ml/100 g is desirable because it is prone to take the high-level structure enabling to expect a large conductivity. If the carbon black is of such a particle size, when a backcoat layer is formed of the carbon black in combination with a binder that will be described hereinafter, the mean surface roughness can be not more than 0.03 μm, preferably not more than 0.030 μm. If the particle size of the carbon black is less than 0.020 μm, it is not suitable because the dispersibility of the carbon black in a coating liquid thereof is deteriorated, while if the particle size exceeds 0.029 μm, it is disadvantageous in respect that the ruggedness on the surface of the backcoat layer becomes so excessive that the ruggedness pattern markings are left on the surface of the magnetic layer of the tape when the tape is wound up.

In this invention, the above-mentioned carbon black is not used together with different other inorganic powdery materials but may be used along with an organic powdery material. The organic powdery material usable in this invention includes benzoguanamine-type resin powder, melamine-type resin powder, phthalocyanine-type pigment, polyolefin-type resin powder, polyester-type resin powder, polyamide-type resin powder, polyimide-type resin powder, and the like.

The organic powdery material usable in this invention is desirable to be porous. The term "porous" used herein implies that the surface of the particles is porous, and this can be easily observed through an electron microscope. In other words, it implies that the bulk specific gravity is smaller than the true specific gravity, and the proportion of the true specific gravity to the bulk specific gravity (true S.G./bulk S.G.) is from 1.2 to 10/1. Those whose true specific gravity is from 0.8 to 2.5 should be used. If the true specific gravity is smaller than this range, the carbon black tends to be floated toward the surface of the backcoat layer to be extricated from the backcoat layer, rendering the backcoat layer tend to be deteriorated, whereas if the true specific gravity exceeds 2.5, the carbon black becomes hardly present on the surface of the backcoat layer to lessen the friction-reducing effect and also to make the carbon black tend to settle down in the coating liquid thereof. The mean particle size of the organic powder is preferably from 0.01 to 0.5 μm, and more preferably from 0.02 to 0.3 μm. And the using quantity of the organic powdery material should be from 1 to 50 parts by weight, and preferably from 2 to 30 parts by weight to 100 parts by weight of a binder.

An example of the benzoguanamine-type resin powder is a resin based on the one derived from the reaction of a compound having the following structural formula with formaldehyde, and includes those obtained by the methylolating, methylenating, or alkyl-etherifying reaction. The resin is also allowed to be a resin powder obtained by the copolymerization of benzoguanamine with urea, melamine or phenol, and includes, in addition to this, those benzoguanamine-type resins produced from similar compounds having similar nature to that of the benzoguanamine resin compounds having the following formula.

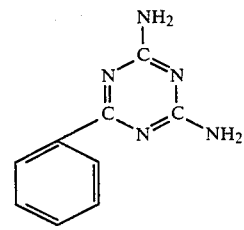

The true specific gravity of the benzoguanamine-type resin powder is preferably from 1.1 to 1.5. The true specific gravity / bulk specific gravity ratio is preferably from 1.3 to 8/1. The particularly important thing of the nature of the benzoguanamine-type resin powder is that the mechanical strength thereof is so large that the powder, when dispersed along with other additives by means of a disperser, can withstand the vigorously dispersing condition by, e.g., a ball mill. The above benzoguanamine-type resin powder is desirable to be one whose maximum particle size is not more than 2.0 μm, more preferably from 0.01 to 0.5 μm, and most preferably from 0.02 to 0.4 μm. The particle size distribution range in this instance is desirable to be as small as possible. However, those of a wider distribution range may also be used, and further a mixture of two groups of particles different in the particle size distribution range may also be used. The benzoguanamine-type resin powder, since well wettable by a binder, particularly a polyurethane resin binder, can be well dispersed into the binder.

The above benzoguanamine-type resin powder is typified by "Eposter" (manufactured by Japan Catalystic Chemical Industry Co., Ltd.

The foregoing phthalocyanine-type pigment includes those having the formula: $(C_8H_4N_2)_4R_n$, wherein R is H, D, Na, K, Cu, Ag, Be, Mg, Ca, Zn, Cd, Ba, Hg, Al, Ga, Ir, La, Nd, Sm, Eu, Gd, Dy, Ho, Er, Th, Tm, Yb, Lu, Ti, Sn, Hf, Pb, V, Sb, Cr, Mo, U, Mn, Fe, Co, Ni, Rh, Pd, Os or Pt; and n is an integer of up to 2. The crystal forms of the phthalocyanine-type pigment include α, β, γ, χ, π, ϵ, and the like. And the compounds represented by the above formula also include those having a substituent such as chlorine. The phthalocyanin-type pigments are preferably those whose maximum particle size is not more than 2.0 μm, and more preferably those whose mean particle size is from 0.02 to 0.5 μm. If the foregoing carbon black is dispersed together with the above organic powdery material, the dispersing effect of the carbon black is surprisingly, remarkably improved. This may, although the reason is not clear, be due to the fact that the above organic powder is dispersed into a hydrophobic binder to thereby aid the dispersion of the carbon black.

When the above organic powdery material and the carbon black of this invention are used in combination, the use of the latter in an amount larger than that of the former is desirable in respect of the improvement on the conductivity.

The binder used in this invention is a binder that will be described hereinafter. The binder is desirable to include urethane resins, of which mixture resins such as a mixture of uréthane resin with vinyl chloride-vinyl acetate copolymer resin and a mixture of urethane resin with phenoxy resin are suitable in respect of the adherence thereof to a support material that will be described hereinafter. Particularly, the vinyl chloride-vinyl acetate copolymer resin is well compatible with the urethane resin, and the mixing ratio thereof can be taken largely, so that it can be very suitably used. The preferred mixing proportion by weight of the vinyl chloridevinyl acetate copolymer resin to the urethane resin is from 25:75 to 75:25. In addition, a partially hydrolyzed vinyl chloride-vinyl acetate copolymer resin may also be used.

Of the above urethane resins, those of the polyester type are more desirable in respect of the dispersibility into the foregoing carbon black than those of the polyether type.

With the above-mentioned binder a hardening agent is desirable to be used in combination. Usable as the hardening agent are well-known isocyanates that will be described hereinafter, which may be used alone or in combination. Of these cyanates those methylenediisocyanate-type or tolylenediisocyanate-type compounds are suitably usable.

The preferred proportional amount of the urethane resin to be used in the backcoat layer is from 20 to 80% by weight of the whole binder (excluding the hardening agent), and that of the hardening agent is from 15 to 40% by weight of the whole binder (including the hardening agent). If the amount of the hardening agent is smaller than this range, the "stick-strip" phenomenon tends to occur, whereas if the amount is excessive, the exfoliation phenomenon tends to occur.

The binder resin to be used for the backcoat layer includes thermoplastic resins, thermosetting resins, reactive type resins, electron beam-setting-type resins, and mixtures of these resins.

The thermoplastic resins useful as the binder resin are those whose softening point is not more than 150° C., average molecular weight is from 10,000 to 200,000 and polymerization degree is from about 200 to 2,000, and which include, e.g., vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinylidene fluoride, vinylidene chloride-acrylonitrile copolymers, acrylonitrile-butadiene copolymers, polyamide resins, polyvinyl butyrals, cellulose derivatives (such as cellulose acetate-butyrate, cellulose diacetate cellulose triacetate, cellulose propionate, nitrocellulose, etc.), styrene-butadiene copolymers, polyester resins, chlorovinyl ether-acrylate copolymers, amino resins, various synthetic rubber-type thermoplastic resins, and mixtures of these resins.

Usable as the thermosetting or reactive-type resin are those resins whose molecular weight is less than 200,000 in the coating liquid form and which become insoluble by the condensation or addition reaction after drying. Of these resins those which will not be softened or fused until the thermal decomposition thereof are useful, and which include, for example, phenol resins, phenoxy resins, epoxy resins, polyurethan-setting resins, urea resins, melamine resins, alkyd resins, silicone resins, acrýl-type reactive resins, vinyl chloride-vinyl acetate resins, mixtures of methacrylates copolymers and diisocyanate prepolymers, mixtures of high-molecular-weight polyester resins and isocyanate prepolymers, urea-formaldehyde resins, mixtures of polyester polyols and isocyanates, polycarbonate-type polyurethanes, polyamide resins; mixtures of low-molecular-weight glycols, high-molecular-weight diols and triphenylmethane triisocyanates; polyamine resins, and mixtures of these resins.

Usable as the electron beam-setting-type resin are unsaturated prepolymers including, for example, anhydride maleic acid-type, urethane acryl-type, polyester acryl-type, polyether acryl-type, polyurethane acryl-type, polyamide acryl-type, and the like compounds, and multifunctional monomers including ether acryl-type, urethane acryl-type, phosphate acryl-type, aryl-type, hydrocarbon-type and the like monomers.

In order to improve the durability of the backcoat layer of the magnetic recording material of this invention, the backcoat layer may contain various hardening agents, such as, e.g., isocyanates.

The usable aromatic cyanates include, e.g., tolylenediisocyanate (TDI), 4,4'-diphenylmethanediisocyanate (MDI), xylilenediisocyanate (XDI), methaxylilenediisocyanate (MXDI), and adducts of these isocyanates with active halogen compounds. And of these, particularly those whose average molecular weight is in the range of from 100 to 3,000 are useful.

On the other hand, the usable aliphatic isocyanates include hexamethylenediisocyanate (HMDI), lysineisocyanate, trimethylhexamethylenediisocyanate (TMDI) and adducts of these isocyanates with active hydrogen compounds. The preferred ones among these aliphatic isocyanates and adducts of these isocyanates with active hydrogen compounds are those having a molecular weight of from 100 to 3,000. Among these aliphatic isocyanates the alicyclic isocyanates and adducts of them with active hydrogen compounds are useful.

The above-described adducts of isocyanates with active hydrogen compounds include adducts of diisocyanates with trihydric polyols. Polyisocyanates also can be used as the hardening agent, which include, e.g., diisocyanate pentamers, decarboxylated compounds produced from 3 moles of diisocyanates and water, and the like. Examples of these include the adduct of 3 moles of tolylenediisocyanate with one mole of trimethylolpropane, the adduct of 3 moles of methaxylilenediisocyanate with one mole of trimethylolpropane, tolylenediisocyanate pentamer, the pentamer consisting of 3 moles of tolylenediisocyanate and 2 moles of hexamethylenediisocyanate, and the like.

For the backcoat layer of this invention, in addition to the above, the combined use of a lubricant, e.g., a stearic acid ester of a monohydric alcohol having from 13 to 16 carbon atoms, is desirable. And other aliphatic acid esters may also be used which include those aliphatic acid esters for the backcoat layer that will be described hereinafter.

Also, for the backcoat layer of this invention, organic dispersing agents and organic antistatic agents may be used which all will be described hereinafter.

The preferred thickness of the backcoat layer of this invention is in the range of from 0.1 to 1.5 μm.

The magnetic layer of the magnetic recording medium of this invention may be a coating-type magnetic layer which uses magnetic powdery material, binder, dispersing agent, lubricant, and the like, and may also be a thin-layer-type magnetic layer formed by the vacuum deposition method, spattering method, vapor deposition method, and the like.

The binder for use in the formation of the magnetic layer may be the same as that for the above-described backcoat layer. Those useful as the magnetic material of the magnetic layer are various ferromagnetic materials including oxide magnetic materials such as, e.g., $\gamma$-$Fe_2O_3$, Co-containing $\gamma$-$Fe_2O_3$, Co-coated $\gamma$-$Fe_2O_3$, $Fe_3O_4$, Co-containing $Fe_3O_4$, $CrO_2$, etc.; metallic magnetic materials consisting principally of Fe, Ni, Co, etc., such as, e.g., Fe, Ni, Co, Fe-Ni alloy, Fe-Co alloy, Fe-Ni-P alloy, Fe-Ni-Co alloy, Fe-Mn-Zn alloy, Fe-Ni-Zn alloy, Fe-Co-Ni-Cr alloy, Fe-Co-Ni-P alloy, Co-Ni alloy, Co-P alloy, Co-Cr alloy, etc; and the like. Additives to be added to these metallic magnetic materials may include elements such as Si, Cu, Zn, Al, P, Mn, Cr, etc., or compounds of these elements. Hexagonal-system ferrite magnetic materials such as barium ferrite, etc., or iron nitride may also be used.

The magnetic coating material to be used for the formation of the above-mentioned magnetic layer may, if necessary, contain additives including dispersing agents, lubricants, abrasives, antistatic agents, and the like.

For example, those usable as the dispersing agent include lecithin; aliphatic acids (R-COOH, wherein R is a saturated or unsaturated alkyl group having from 7 to 17 carbon atoms) having from 8 to 18 carbon atoms, such as caprylic acid, capric acid, lauric acid, myristic acid, palmitic acid, stearic acid, oleic acid, elaidic acid, linolic acid, linolenic acid, etc.; metallic soaps including alkali metal (Li, Na, K, etc.) salts or alklaine earth metal (Mg, Ca, Ba, etc.) salts of the above aliphatic acids; and the like. In addition to these, higher alcohols having not less than 12 carbon atoms, and further sulfates, and the like, also may be used. And, those commercially available, generally used surface active agents also are usable. These dispersing agents may be used alone or in combination. Further, these dispersing agents are allowed to be used in the foregoing backcoat layer. Any of these dispersing agents, when applied to the magnetic layer, is added thereto in an amount of from 1 to 20 parts by weight to 100 parts by weight of the magnetic material, and, when applied to the backcoat layer, is added thereto in an amount of from 2 to 20 parts by weight to 100 parts by weight of the binder.

Those usable as the lubricant include silicone oil; graphite; molybdenum disulfide; tungsten disulfide; aliphatic acid esters obtained from monobasic aliphatic acids having from 12 to 16 carbon atoms and monohydric alcohols having from 3 to 12 carbon atoms; aliphatic acid esters having from 21 to 23 carbon atoms obtained from monobasic aliphatic acids having not less than 17 carbon atoms and monohydric alcohols having the rest number of carbon atoms; and the like. Any of these lubricants is added in the quantity range of from 0.2 to 20 parts by weight to 100 parts by weight of the binder.

Those usable as the antistatic agent include conductive powdery materials such as carbon black, graphite, tin oxide-antimony oxide-type compounds, titanium oxide-tin oxide-antimony oxide-type compounds, carbon black-graft polymers, etc; natural surfactants such as saponin; nonionic surface active agents such as alkylene oxide-type, glycerol-type and glycidol-type compounds; cationic surface active agents such as pyridine and other heterocyclic compounds, phosphonium and sulfonium-type compounds; anionic surface active agents containing an acid group such as carboxylic acid group, sulfonic acid group, phosphoric acid group, sulfate group, phosphate group, etc.; amphoteric surface active agents such as amino acids, aminosulfonic acids, sulfuric acid esters or phosphoric acid esters of aminoalcohols; and the like.

Those solvents to be contained in the foregoing coating liquid or to be used as the diluent solvent applied when coating the liquid include ketones such as acetone, methyl-ethyl ketone, methyl-isobutyl ketone, cyclohexanone, etc.; alcohols such as methanol, ethanol, propanol, butanol, etc.; esters such as methyl acetate, ethyl acetate, butyl acetate, ethyl lactate, ethyleneglycol monoacetate, etc.; ethers such as glycol-dimethyl ether, glycol-monoethyl ether, dioxane, tetrahydrofuran, etc.; aromatic hydrocarbons such as benzene, toluene, xylene, etc.; halogenated hydrocarbons such as methylene chloride, ethylene chloride, carbon tetrachloride, chloroform, dichlorobenzene, etc.; and the like.

Those materials usable as the support include polyesters such as polyethylene terephthalate, polyethylene-2,6-naphthalate, etc.; polyolefins such as polypropylene; cellulose derivatives such as cellulose triacetate, cellulose diacetate, etc.; plastics such as polyamides, polycarbonates, etc.; and the like. Further, metals such as Cu, Al, Zn, etc., glass plates, BN, silicon carbide, ceramics such as porcelain, earthenware, etc., may also be used.

The thickness of these support materials should be from about 3 to 100 $\mu$m, and preferably from 5 to 50 $\mu$m in the film or sheet form, and should be from 30 $\mu$m to 10 mm in the disk or card form. In the case where the support should be of the drum type, the support is made in the cylindrical form, whose concrete form and dimensions are to be determined according to the recorder used.

The formation of the backcoat layer on a support may be carried out by any method, which includes the air doctor coating method, blade coating method, air knife coating method, squeeze coating method, impregnation method, reverse control coating method, transfer roll coating method, gravure coating method, kiss coating method, cast coating method, spray coating method, and the like, but the applicable coating methods are not limited to the described methods.

EFFECT OF THE INVENTION

In the present invention, the foregoing carbon black, since it is used without different inorganic powdery materials in the backcoat layer, by no means scratches or scrapes off the surface of the guide pole, etc., like those hard inorganic powdery materials used in conventional backcoat layers, and besides, the carbon black, since it is relatively hydrophobic, will hardly absorb moisture even when the magnetic recording medium is placed under a moist atmospheric condition during its storage or during its use in a video deck, so that e.g., the "stick-strip" phenomenon of the magnetic tape against the guide pole, etc., can be lessened. The foregoing particle size of the carbon black enables the carbon black to disperse well with satisfactory dispersing stability in a coating liquid thereof, and therefore the surface of the backcoat layer formed by use of the dispersed liquid has a uniform roughness with its particles having a large adherence, and when the mean surface roughness is from 0.005 to 0.035 $\mu$m, and preferably from 0.005 to 0.030 $\mu$m, the mean surface roughness enables the improvement of not only the running smoothness but also the running stability of the magnetic tape with its improved function to prevent the stick-strip phenomenon. Further, the backcoat layer, because of being provided directly on the support, undergoes no such an adverse influence as by the ruggedness of the subbing layer containing an inorganic powdery material as observed in the conventional backcoat layer, so that the surface of the backcoat layer can be improved not to be excessively roughened.

EXAMPLES

The present invention will be further illustrated by the following examples, but the invention is not limited thereto.

EXAMPLE 1

A magnetic layer is in advance coated on a polyethylene terephthalate film support in the following manner:

The components given in the "Magnetic layer coating liquid 1" column of Table 1 (shown in parts by weight) are put in a ball mill, and dispersed to prepare a dispersed liquid. This dispersed liquid is filtrated through a filter of 1 $\mu$m, and to this filtrate are added 5 parts by weight of a multifunctional isocyanate to be mixed to thereby prepare a magnetic coating liquid. The magnetic coating liquid is coated by a reverse roll coater to be 5 $\mu$m-thick on the support, and after that the coated layer is supercalendered.

Subsequently, the components given in the "Backcoat layer coating liquid 1" column of Table 1 are put in a ball mill to be dispersed for 5 hours to prepare a coating liquid. The coating liquid is coated by a reverse roll coater on the reverse side of the above support, and then dried to thereby form a backcoat layer with a dry thickness of 0.5 $\mu$m. The obtained product is then slit into ½-inch width, whereby a magnetic tape is obtained.

EXAMPLE 2

A magnetic tape of Example 2 is prepared in the same manner as in Example 1 except that the components given in the "Magnetic layer coating liquid 2" column of Table 1 and the components given in the "Backcoat layer coating liquid 2" column of the same table are used in place of the components of the "Magnetic layer coating liquid 1" and the components of the "Backcoat layer coating liquid 1" used in Example 1, respectively.

EXAMPLE 3

A magnetic tape of Example 3 is prepared in the same manner as in Example 1 except that the components given in the "Magnetic layer coating liquid 3" column of Table 1 and the components given in the "Backcoat layer coating liquid 3" column of the same table are used in place of the components of the "Magnetic layer coating liquid 1" and the components of the "Backcoat layer coating liquid 1" used in Example 1, respectively.

COMPARATIVE EXAMPLES 1 to 4

Magnetic tapes as Comparative Examples 1, 2, 3 and 4 are prepared in the same manner as in Example 1 except that the components of Magnetic Layer Coating Liquids 1, 2, 3 and 4 and the components of Backcoat Layer Coating Liquids 1, 2, 3 and 4, given as Comparative Examples in Table 1, are used in place of the components of Magnetic Layer Coating Liquid 1 and the components of Backcoat Layer Coating Liquid 1 in Example 1, respectively.

Each of the magnetic tapes of Examples 1 and 2 and of Comparative Examples 1, 2 and 3 was tested with respect to the items shown in Table 2, and the obtained results are shown in the rows of the column corresponding to the items in Table 2.

The measurement and determination procedure steps adopted are as follows:

(a) Chroma S/N ratio (dB) A chroma signal (3.58 MHz) was adjusted to 0.714 Vp-p to be put on a luminance signal to make a picture recording. The picture-recorded tape was played back to take out the chroma signal alone to therefrom obtain a ratio of the effective value (S) thereof to the noise level (N) when the chroma signal is excluded. The value obtained from the magnetic tapes of Examples 1 and 2 and from the ones of Comparative Examples 2 and 3 are indicated in the form of relative values to the value regarded as zero of the magnetic tape of Comparative Example 1.

(b) Jitter value: This was measured by use of a VTR Jittermeter, manufactured by Meguro Electrics Corporation.

(c) Wound form: 400-time-repeated runs of each of the magnetic tapes were tried on a video deck ("NV300," manufactured by Matsuishita Electric Industrial Co., Ltd.). Those wound with the edge thereof forming an even flat face were rated at "A," and those forming an uneven face were rated at "B."

(d) Surface roughness: This was measured by use of a 3-dimensional roughness measuring instrument 3E-3RK, manufactured by Kosaka Kenkyusho K.K.

(e) Dispersibility test: The coating liquid for each backcoat layer was coated on a glass plate by an applicator, and the sizes of the dispersed particles were observed through a microscope, and rated at five grades 1 through 5 ("5" for the best, "1" for the worst), of which the grades of 4 and over were regarded as acceptable, and the grades of 2 and below were regarded as unacceptable.

In addition, as for the stick-slip phenomenon, one not showing the phenomenon at all was rated as "A," one showing the phenomenon slightly was rated at "B," and one showing much of the phenomenon was rated at "C."

From the results shown in Table 2, it is apparent that by comparison of Example 1 with the corresponding Comparative Example 1, and also by comparison of Example 2 with the corresponding Comparative Example 2, the tapes of Examples show satisfactory results in all the test items, whereas the tape of Comparative Example 3 shows poor dispersibility of the carbon black due to the small size of the particles thereof; large surface roughness of the backcoat layer due to the poor-dispersibility carbon black; and unsatisfactoriness in the chroma S/N ratio, jitter and wound form of the tape. And Comparative Example 3 shows unsatisfactory results in all the test items because calcium carbonate was used. Particularly, the stick-strip phenomenon appeared during the tests.

TABLE 1

| | Example | | | | | | Comparative Example | | | | | | | |
|---|---|---|---|---|---|---|---|---|---|---|---|---|---|---|
| | Magnetic layer coating liquid | | | Backcoat layer coating liquid | | | Magnetic layer coating liquid | | | | Backcoat layer coating liquid | | | |
| | 1 | 2 | 3 | 1 | 2 | 3 | 1 | 2 | 3 | 4 | 1 | 2 | 3 | 4 |
| Co—containing $\gamma$-Fe$_2$O$_3$ | | 100 | | | | | | 100 | 100 | | | | | |
| Fe—type metal magnetic powder | 100 | | | | | | 100 | | | | | | | |
| CO—Ni (20-80) alloy | | | 100 | | | | | | | 100 | | | | |
| Polyeurethane (Esthane 5701, product of Goodrich) | 12 | 12 | 12 | 100 | 100 | 100 | 12 | 12 | 12 | 12 | 100 | 100 | 100 | 100 |
| Vinyl chloridevinyl acetate copolymer (VAGH, Union Carbide) | | 8 | | | 70 | | | 8 | 8 | | | | | |
| Phenoxy resin (PKHH, Union Carbide) | 8 | | 8 | 70 | | | 8 | | | 8 | 70 | 70 | 70 | |
| Nitro-cellulose | | | | | | 70 | | | | | | | | 70 |
| Isocyanate (Coronate L) | | | | 30 | 45 | 45 | 30 | | | | 30 | 30 | 30 | 45 |
| Carbon black with primary mean particle size 0.024 μm | | | | 110 | 115 | 115 | | | | | | | | |
| Carbon black with primary mean particle size 0.012 μm | | | | | | | | | | | 110 | 110 | | 115 |
| Calcium carbonate, primary mean particle size 0.070 μm | | | | | | | | | | | | | 110 | |
| Butyl stearate | 0.8 | 0.8 | 0.8 | | | | 0.8 | 0.8 | 0.8 | 0.8 | | | | |
| Myristic acid | 0.8 | 0.8 | 0.8 | | | | 0.8 | 0.8 | 0.8 | 0.8 | | | | |
| Alumina | 5 | 5 | 5 | | | | 5 | 5 | 5 | 5 | | | | |
| Carbon black | 5 | 5 | 5 | | | | 5 | 5 | 5 | 5 | | | | |
| Lecithin | 4 | 4 | 4 | | | | 4 | 4 | 4 | 4 | | | | |
| Isocetyl stearate | | | | | 7 | | | | | | | | | |
| Cyclohexanone | 100 | 100 | 100 | 600 | 600 | 600 | 100 | 100 | 100 | 100 | 600 | 600 | 600 | 600 |
| Methyl-ethyl ketone | 50 | 50 | 50 | 1000 | 1000 | 1000 | 50 | 50 | 50 | 50 | 1000 | 1000 | 1000 | 1000 |
| Toluene | 10 | 10 | 10 | | | | 10 | 10 | 10 | 10 | | | | |

TABLE 2

| | Example | | | Comparative Example | | | |
|---|---|---|---|---|---|---|---|
| | 1 | 2 | 3 | 1 | 2 | 3 | 4 |
| Chroma S/N (dB) | +4 | +5 | +2 | 0 | −1 | −3 | 0 |
| Jitter value (us) | 0.1 | 0.08 | 0.12 | 0.27 | 0.25 | 0.36 | 0.25 |
| Stick-strip | A | A | A | B | B | C | C |
| Wound form | A | A | A | B | B | A | C |
| Mean surface roughness (um) of backcoat layer | 0.026 | 0.025 | 0.025 | 0.036 | 0.038 | 0.040 | 0.038 |
| Maximum surface roughness (um) of backcoat layer | 0.11 | 0.11 | 0.15 | 0.17 | 0.22 | 0.32 | 0.23 |
| Dispersibility test | 5 | 5 | 5 | 2 | 3 | 2 |

In addition, the coefficients of friction of the backcoat layers of the magnetic tapes of Examples 1 and 2 were 0.24 and 0.20, respectively.

What is claimed is:

1. A magnetic recording medium comprising a support, a magnetic layer on said support and a backing coat layer formed on the other side of said support, wherein said backing layer consists essentially of
a binder resin, a conductive carbon black having a mean particle size of from 0.02 μm to 0.029 μm in the range of 25% to 100% by weight of said binder, an organic powder having a mean particle size of from 0.01 μm to 0.5 μm in the range of 1% to 50% by weight of said binder, and said backing layer having a surface roughness in the range of 0.005 μm to 0.035 μm and an electric resistivity in the range of $10\Omega$ cm to $10^6\Omega$ cm.

2. The magnetic recording medium of claim 1, wherein oil-absorbing amount of said carbon black is in the range of from 90ml/100 g to 500ml/100 g.

3. The magnetic recording medium of claim 1, wherein said binder contains a urethane resin and a isocyanate.

4. The magnetic recording medium of claim 3, wherein said binder contains a nitrocellurose.

5. The magnetic recording medium of claim 1, wherein said backing coat layer has the thickness in the range of from 0.1 μm to 1.5 μm.

6. The magnetic recording medium of claim 1 wherein said organic powder is selected from the group consisting of benzoguanamine resin powder, melamine resin powder, phthalocyanine resin powder, polyolefin resin powder, polyester resin powder, polyamide resin powder and polyimide resin powder.

* * * * *